US008139270B2

(12) United States Patent
Fan et al.

(10) Patent No.: US 8,139,270 B2
(45) Date of Patent: Mar. 20, 2012

(54) VARIABLE DATA PERIODIC LINE PATTERNS FOR COMPOSING A FONT SYSTEM

(75) Inventors: Zhigang Fan, Webster, NY (US); Reiner Eschbach, Webster, NY (US); Judith E. Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1328 days.

(21) Appl. No.: 11/756,375

(22) Filed: May 31, 2007

(65) Prior Publication Data

US 2008/0297852 A1 Dec. 4, 2008

(51) Int. Cl.
*H04N 1/405* (2006.01)

(52) U.S. Cl. ........................................ 358/3.28; 358/468

(58) Field of Classification Search .................... 705/40; 358/3.28, 1.9, 2.1, 3.06, 3.13, 3.2, 3.27, 534–536, 358/1.11–1.12, 451, 468; 382/237, 270, 382/298–299; 283/91, 93, 113
See application file for complete search history.

(56) References Cited

U.S. PATENT DOCUMENTS

| | | | | |
|---|---|---|---|---|
| 4,597,593 | A * | 7/1986 | Maurer | 283/94 |
| 4,738,949 | A * | 4/1988 | Sethi et al. | 503/227 |
| 5,483,602 | A * | 1/1996 | Stenzel et al. | 382/135 |
| 7,787,154 | B2 * | 8/2010 | Fan et al. | 358/3.28 |
| 2007/0204755 | A1 * | 9/2007 | Moreau | 101/41 |

OTHER PUBLICATIONS

U.S. Appl. No. 11/313,397, filed Dec. 21, 2005, Eschbach.
U.S. Appl. No. 11/314,509, filed Dec. 21, 2005, Eschbach.

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A method and system is provided for generating a variable data differential line pattern font comprising forming a periodic line pattern suitable for tessellation disposition within a printed document and selectively distorting a portion of the periodic line pattern in a predetermined manner wherein the distorting comprises generating a distinguishable font corresponding to the distorting. A plurality of different distinguishable fonts are formed by a corresponding plurality of distorted line patterns, respectively.

21 Claims, 3 Drawing Sheets

FIG. 4
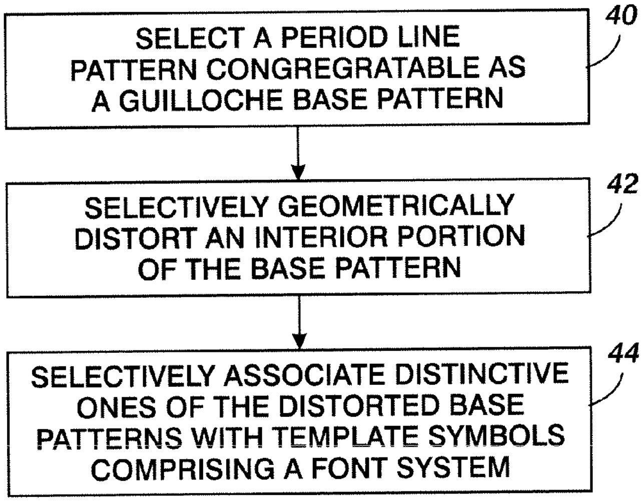
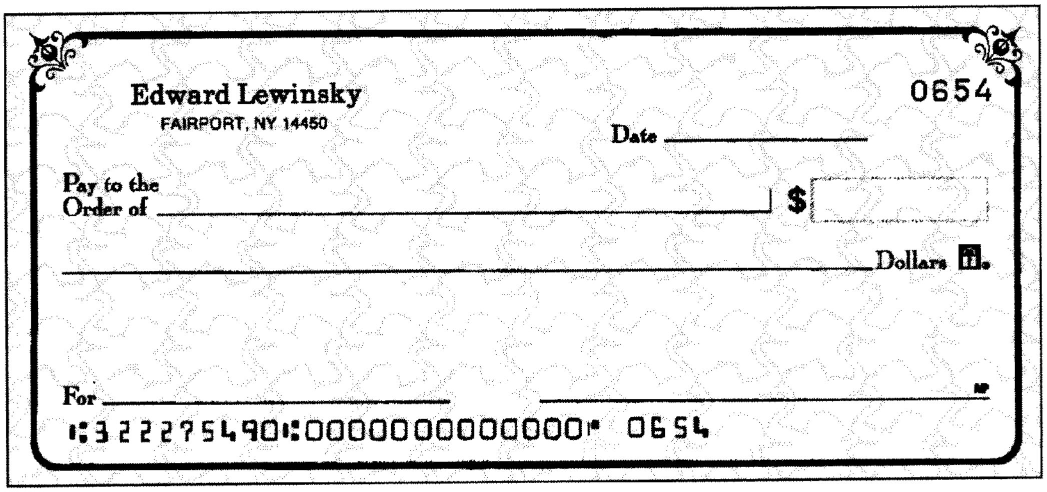
FIG. 5

VARIABLE DATA PERIODIC LINE PATTERNS FOR COMPOSING A FONT SYSTEM

CROSS REFERENCE TO RELATED APPLICATIONS

Cross reference is made to the following application filed concurrently with and incorporated by reference herein: U.S. patent application Ser. No. 11/756,390, filed May 31, 2007, now U.S. Pat. No. 7,787,154 "Font Printing System Having Embedded Security Information Comprising Variable Data Periodic Line Patterns".

Cross reference is also made in particular to the following pending applications: U.S. Ser. No. 11/313,397, filed Dec. 21, 2005, "Variable Differential Gloss Font Image Data", and Ser. No. 11/314,509, filed Dec. 21, 2005, "Printed Visible Fonts with Attendant Background".

TECHNICAL FIELD

The presently disclosed embodiments are directed to period line pattern printing systems particularly applied as background to humanly perceptible alphanumerical, graphical or pictorial information.

BACKGROUND

Since print systems have been in existence, printers have sought methods for inhibiting counterfeiting and unauthorized copying of printed documents. Enhanced complexity in an engraved pattern of a press plate is one such method that most people are familiar with as a result of its everyday observation in currency bills. Bank checks, security documents, bonds and other financial documents are other examples of printed documents having complex background patterns to inhibit unauthorized reproduction. Identification documents, e.g. passports, social security cards and the like, are other examples. Credit cards not only have complex background patterns, but now also have embedded holographics to enhance verification and authentication of such a card.

As far as printed documents are concerned, a common complex background pattern is a guilloché line pattern, i.e., an ornamental pattern or border consisting of lines flowing in interlaced curves. FIG. 5 is a check pattern exemplifying a guilloché. The guilloche patterns are designed to be hard to reproduce and thus can serve as a security feature. However, an associated disadvantage is that the applied pattern or information is often fixed in nature. Accordingly, the fixed nature of the pattern means that it is common and identical on all documents on which it is printed. Often it is preprinted on the document before the document is usually used (e.g., checks).

More particularly, even though such background patterns are designed to be hard to reproduce, at the same time, they are fixed, meaning every passport has the same pattern as all passports from that country, every monetary note has the same pattern as the same note from that country, any credit card has the same pattern, etc. This actually decreases the amount of security afforded by a guilloché since it is sufficient to re-create one pattern in order to counterfeit N credit cards. It would therefore be desirable and a substantial improvement to have a variable guilloché, where, for example, the credit card number is embedded in the guilloché and thus every credit card has a different pattern (to a decoder) while having the identical human visual impression.

There is a need for embedding security information that more particularly identifies a particular document in a unique manner so that whatever information is embedded is visually imperceptible to an intended counterfeiter or unauthorized copyist even for a single document produced in a print run of the one document only.

Glyph technology, cf. U.S. Pat. No. 5,449,896, is another well known security system which can uniquely identify a document, but the inclusion of a glyph code (or any bar coding system of that type) is easily humanly perceptible for its inclusion on the document, although the meaning of the glyph itself is generally only machine decodable.

There also exists various digital watermarking methods that embed information into images. However, most such methods were designed mainly for continuous-tone pictorial type images. They often modulate the intensity (color) of individual pixels. When applied to line patterns, these methods result in isolated pixels that cannot be reliably printed.

One common aspect of all such security feature applications is the addition of some kind of information into the document that prevents/hinders alterations and counterfeiting.

There is thus a need for a system which better hides security data within a printed document, and that which can embed security data unique to that particular document so that the security information is successfully implemented for even a document production run of one document.

SUMMARY

According to the aspects illustrated herein, there is provided a system and method comprising a variable data guilloché font pattern, particularly useful as embedded security data in a printed document. A periodic line base pattern has an exterior portion configured for seamless tilable association in a congregated plurality of the base patterns to form the guilloché pattern. An interior portion of the base pattern comprises a variable line pattern distortion wherein a plurality of distinctive ones of the variable distortions respectively correspond to a set of predetermined template symbols. An arrangement of the template symbols appears as a common guilloché pattern that actually comprises predeterminable and decodable security data for the printed document.

Another disclosed feature of the embodiments is a font system comprised of a plurality of distinguishable line patterns respectively representative of a plurality of distinguishable symbols wherein each of the line patterns has an exterior portion and an interior portion. The exterior portion is identical for each of the line patterns for seamless tilable association. The interior portion includes an identifiable distortion representative of a corresponding distinguishable symbol. The distortion is identifiable through digital decoding upon scanning of a document including the font system.

BRIEF DESCRIPTION OF THE DRAWINGS

FIG. 4 is a flow chart illustrating a method for creating the subject font system; and, FIG. 5 is a bank check comprising a background line pattern that may include a font system of distorted base patterns recognizable as security or identity information.

DETAILED DESCRIPTION

As noted above, periodic line patterns, such as guilloché patterns, are commonly used in graphic design for security documents such as checks and currency notes.

Figure 1:
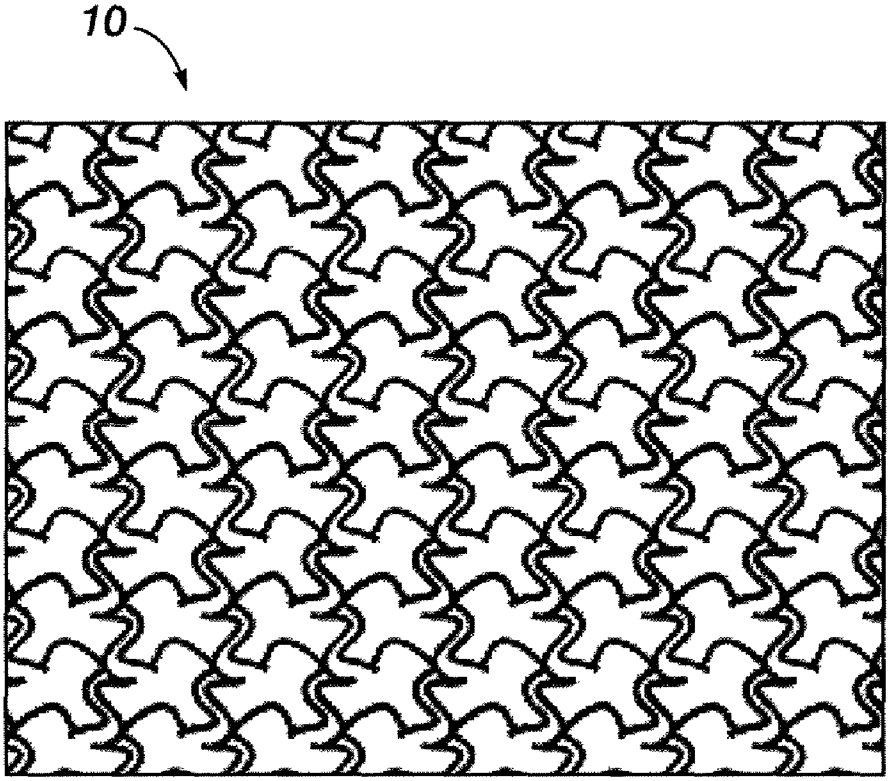
FIG. 1 is a periodic line pattern, such as a guilloché pattern comprised of repetitions of a base pattern element.
Figure 2:
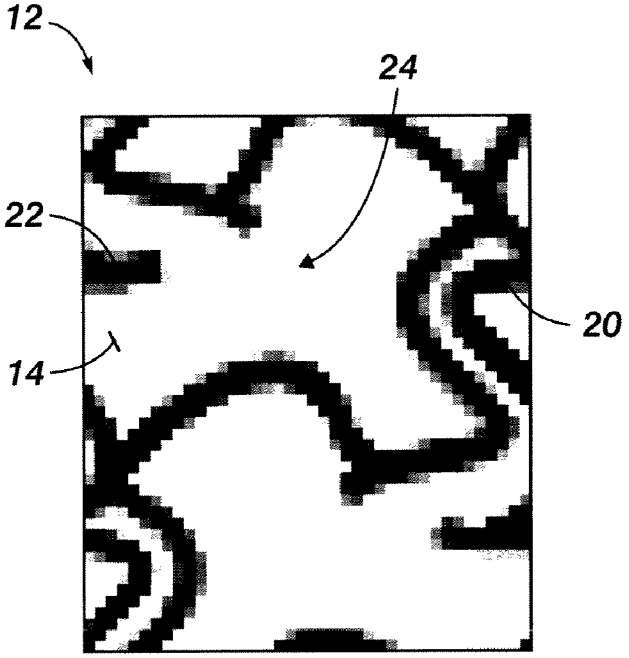
FIG. 2 is a representation of the base pattern element comprising FIG. 1.

By definition, a period pattern can be generated by a repetition or tessellation of a rectangular "base pattern", although other space tiling shapes and tile shifts/offsets are also possible and considered within the scope of this description. The base pattern has the property that there is no artificial discontinuity if two base patterns are placed next to each other, whether in a horizontal or vertical direction. FIG. 1 is an example of period pattern 10, and FIG. 2 shows a base pattern 12 (enlarged) for FIG. 1. FIG. 1 is thus a seamless, tilable association of the base pattern of FIG. 2. It is evident from FIG. 1 that the term "line pattern" used throughout this description is considered to be general, encompassing classical line patterns created in the guilloche process, as well as figurative patterns, icons and the like.

The base pattern is comprised of an exterior portion 14 of the pattern frame boundary wherein the line patterns have terminal ends 20 that will be matingly aligned with another terminal end 22 wherein a plurality of the base patterns 12 are congregated in a plurality of adjoining repetitions. The base pattern 12 also has an interior portion 24 spaced inwardly from the side walls of the base pattern, but the lines of the interior portion are also mostly seamlessly aligned with the lines of the exterior portion to similarly avoid readily apparent line discontinuities in the pattern arrangement.

Figure 3:
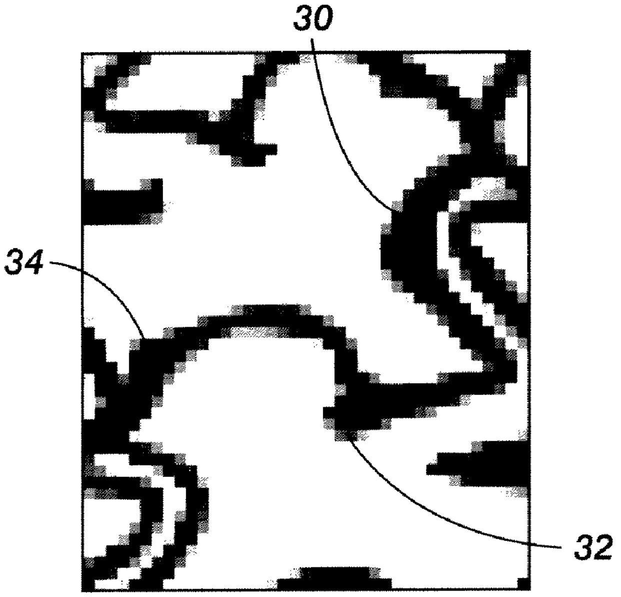
FIG. 3 is a line pattern comprising a geometric distortion of the base pattern of FIG. 2.

FIG. 3 comprises a distortion of the base pattern of FIG. 2. Even in the enlarged versions of FIGS. 2 and 3, only with a close inspection and comparison between FIGS. 2 and 3 can one identify the distortion occurring at points 30, 32 and 34. However, the distortions are significant enough to be discernible with the scanning in a digitized coding of FIG. 3.

A disclosed feature of the present embodiments is that a plurality of distinctive distortions, similar to FIG. 3, but individually or collectively discernible, are set to correspond to a set of symbols, i.e. an alphabet of templates, so that by embedding in the document a set of such distorted base patterns, the desired security or identifying data is included in the printed document.

Thus, such subtle geometric distortions in the line patterns though virtually imperceptible to the human eye, can be effectively implemented as a font alphabet of any number of symbols.

The embedding process includes two parts: 1) template generation to produce a set of period line pattern templates; and 2) symbol embedding to insert the patterns that represent the input symbols into the documents. The former is performed once by the system designers, typically offline, while the latter is performed by the users at document creation time.

During template creation, a set of N templates, where N is the number of symbols to be embedded, is created such that each template resembles the base pattern in general, but differs from the base pattern in minute details. This can be accomplished by slightly modifying the base pattern. There are various methods of doing that. The following is one desired embodiment.

After a base pattern is selected 40 (FIG. 4), an MxK grid is imposed on the base pattern, where M, and K are the number of grid points contained in the base pattern in horizontal and vertical directions, respectively. The grid points are indexed by (m,k), where $0 \leqq m < M$ and $0 \leqq k < K$. For each interior grid point (m, k) such that $d \leqq m \leqq M-d$, $d \leqq k < K-d$, where d is a predetermined small positive integer, two random numbers r_x(m,k) and r_y(m,k) are generated. A template, the same size as the base pattern, is generated by locally shifting the basic pattern as follows: 1) if the pixel is on an interior grid point (m, k), the pixel is shifted by [r_x(m,k), r_y(m,k)]; 2) if the pixel is on a boundary (non-interior) grid point, no shift is performed; 3) if the pixel is not on the grid, its shift is an interpolation of the shifts of its four nearest neighboring grid points. Any standard interpolation method can be applied such as to bi-linear interpolation. Specifically, $S_{xy}$, the shift vector for pixel (x, y) is determined as:

$$S_{xy}=\alpha\beta S_{ij}+\alpha(1-\beta)S_{(i+1)j}+(1-\alpha)\beta S_{i(j+1)}+(1-\alpha)(1-\beta)S_{(i+1)(j+1)}$$

where $S_{ij}$, $S_{(i+1)j}$, $S_{i(j+1)}$, and $S_{(i+1)(j+1)}$ are the shift vectors for the top left, bottom left, top right, and bottom right grid points, respectively. Coefficients α and β are obtained as:

$$\alpha=x/s_x-i$$

$$\beta=y/s_y-j$$

where $S_x$ and $S_y$ are the distances between the neighboring grid points for horizontal and vertical directions, respectively.

The template generated 42 by the above procedure is a slightly distorted version of the base pattern. By varying random numbers, N templates can be produced. Since the pixels close to the boundaries of the patterns are not shifted, the border areas of the templates are the same as the base patterns. Consequently, when two templates are placed next to each other, there is no obvious discontinuity. FIG. 3 is an exemplar template pattern generated for the base pattern given in FIG. 2.

If the document design contains multiple sets of periodic line patterns, information can be embedded into each of them independently, as long as the patterns are separable in color.

Once the template patterns are generated, symbol embedding is straightforward by associating 44 (i.e. arranging in a predetermined order to compose a security code) distorted base patterns as the template symbols to form the desired code. For example, the symbols could correspond to keyboard alphanumerics. For each symbol to be embedded, the template pattern that represents the symbol is used to replace the original period pattern. FIG. 5 shows an exemplar check, with the name of the check owner embedded. Thus, enough distinctive template symbols are embedded in the seemingly consistent repetition of the base pattern, that the security information is included but effectively hidden.

The embedded information can be recovered, when the document is digitized. The retrieval process contains two steps: line extraction and template matching.

First, the periodic line patterns are extracted. As the color of the line patterns are typically quite distinguishable from the paper background and the other parts of the document, they can be easily obtained using thresholding or a simple color distance comparison. Specifically, a pixel is determined to be a part of the line pattern if the distance between its color and the line pattern color is smaller than a predetermined threshold. If multiple period patterns are involved, each of them can be extracted separately, using the above procedure.

The extracted line patterns are then divided into disjoint rectangular blocks, each with the same size as the basic pattern. Each block is then matched to the N templates. Almost any standard template matching method can be applied here. To take care of possible registration error between the template and the data, the template is shifted in both horizontal and vertical directions for −R to R pixels, where R is a predetermined positive integer. The symbol associated with the template with the highest matching score under the best registration position is determined as the detected symbol. Specifically, $$\text{DectectedSymbol}=\text{argMax}_{0<n<N}\text{Max}_{-R<shift\_x<R,-R<shift\_y<R}\text{Matchscore}[\text{data}, \text{template}(n), \text{shift\_}x, \text{shift\_}y]$$

The retrieved information can be used for many different purposes, which include authentication (e.g., comparing the embedded name information with the name on the check), process control (e.g., routing a check), and banking automation (e.g., recording the dollar amount of a check into the user's account). The subtle geometric distortions in the line patterns comprising the embedded information do not introduce printability problems and are easily implementable within conventional printing systems.

The claims can encompass embodiments in hardware, software, or a combination thereof.

The word "printer" as used herein encompasses any apparatus, such as a digital copier, bookmaking machine, facsimile machine, multi-function machine, etc. which performs a print outputting function for any purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printer including an electronically stored variable data guilloché pattern for embedding security data in a document printed by the printing system, comprising:

a base pattern having an exterior portion configured for seamless tilable association in an associated plurality of the base patterns to form the guilloché pattern, and an interior portion comprised of a variable pattern distortion; and, wherein a plurality of distinctive ones of said variable patterns distortions disposed within a plurality of the base patterns respectively correspond to a set of predetermined template symbols.

2. The printer of claim 1 wherein the interior portion variable distortions of the variable data guilloché pattern are substantially imperceptible to a human eye.

3. The printer of claim 1 wherein the base pattern of the variable data guilloché pattern comprises a period line pattern lacking any line discontinuity with adjacent ones of the base pattern forming the guilloché pattern.

4. The printer of claim 3 wherein the interior portion variable pattern distortions of the variable data guilloché pattern are seamlessly disposed within the exterior portion to further avoid the line discontinuity in the arrangement.

5. The printer of claim 4 wherein the distortions of the variable data guilloché pattern comprise line variations detectable with digital coding of the guilloché pattern.

6. The printer of claim 5 wherein the line variations of the variable data guilloché pattern are line thickness variations.

7. The printer of claim 5 wherein the line variations of the variable data guilloché pattern comprise line extensions and indentations.

8. The printer of claim 1, wherein the variable data guilloché pattern further comprises a unique security identifier for a single document in a document printing run of one.

9. The printer of claim 1 wherein the variable pattern distortion of the variable data guilloché pattern comprises a geometric line transformation of the base pattern interior portion, substantially visually imperceptible to a human eye with the guilloché pattern.

10. The printer of claim 9 wherein the geometric line transformation of the variable data guilloché pattern comprises a local shift.

11. A method for generating a variable data differential line pattern font comprising:

by a printer, forming a period line pattern suitable for tessellation within a printed document;

by the printer, selectively distorting a portion of the period line pattern in a predetermined manner wherein the distorting comprises generating a distinguishable font corresponding to the distorting; and embedding the period line pattern inclusive of the selectively distorted portion thereof in the printed document printed by the printer.

12. The method of claim 11 wherein the distorting comprises embedding the distorting within edge portions of the period line pattern.

13. The method of claim 11 wherein the distorting comprises making a geometric distortion in the line pattern.

14. The method of claim 11 wherein the period line pattern comprises a line pattern image block and the method further includes disposing the first font in the image block.

15. The method of claim 11 wherein the period line pattern includes a base pattern and the distorting comprise precluding artificial discontinuity between adjoining ones of the base pattern.

16. The method of claim 15 wherein the distorting the period line pattern comprises generating a set of templates respectively corresponding to a plurality of distinguishable font symbols for selective embedding with the period line pattern.

17. The method of claim 15 wherein the distorting comprises shifting an interior grid point of the base pattern.

18. The method of claim 17 wherein the shifting avoids visually perceptible line discontinuities about the interior grid point.

19. The method of claim 11 wherein the disposing the period line pattern comprises distinguishing the period line pattern from ambient portions of the printed document by color differentiation.

20. The method of claim 19 wherein the distinguishing comprises digitizing the period line pattern and determining resulting pixel values of the image blocks for font color recognition.

21. The method of claim 11 executable within a xerographic printing system as a unique security code for a single document in a printing run of one.

* * * * *